(12) United States Patent
Wade et al.

(10) Patent No.: US 10,379,967 B2
(45) Date of Patent: Aug. 13, 2019

(54) LIVE ROLLBACK FOR A COMPUTING ENVIRONMENT

(71) Applicant: Citrix System, Inc., Fort Lauderdale, FL (US)

(72) Inventors: Chris Wade, Ocean Ridge, FL (US); Stanislaw Skowronek, New York, NY (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 95 days.

(21) Appl. No.: 15/583,975

(22) Filed: May 1, 2017

(65) Prior Publication Data

US 2017/0255527 A1    Sep. 7, 2017

Related U.S. Application Data

(63) Continuation of application No. 14/557,317, filed on Dec. 1, 2014, now Pat. No. 9,639,432.

(51) Int. Cl.
*G06F 12/16* (2006.01)
*G06F 11/14* (2006.01)
(Continued)

(52) U.S. Cl.
CPC ...... *G06F 11/1469* (2013.01); *G06F 11/1438* (2013.01); *G06F 11/36* (2013.01);
(Continued)

(58) Field of Classification Search
CPC ............. G06F 11/1446; G06F 11/1471; G06F 11/1458; G06F 2201/84
(Continued)

(56) References Cited

U.S. PATENT DOCUMENTS

2005/0097294 A1 * 5/2005 Hepkin ................. G06F 9/4812
                                                                711/170
2005/0138484 A1 * 6/2005 Moyer ................ G06F 11/3632
                                                                714/47.1
(Continued)

OTHER PUBLICATIONS

International Search Report for PCT Application PCT/US2015/015275; dated Jul. 27, 2015; 13 pages.
(Continued)

*Primary Examiner* — Chae M Ko
(74) *Attorney, Agent, or Firm* — Foley & Lardner LLP; Christopher J. McKenna

(57) ABSTRACT

A first computing device is provided for rolling back a computing environment. The computing device includes processors configured to acquire a stream containing entries including snapshot entries, memory entries, and input/output entries wherein each entry includes information and is associated with a timestamp. The processors are further configured to receive a snapshot entry associated with a first timestamp, revert to a memory state using information provided in at least one memory entry associated with a timestamp after the first timestamp, and re-execute a previously executed process, wherein the re-execution of the process is started using the first timestamp, information from the received snapshot entry, and information for input/output operations corresponding to the input/output entries associated with timestamps after the first timestamp.

27 Claims, 10 Drawing Sheets

(51) Int. Cl.
*G06F 11/36* (2006.01)
*G06F 11/30* (2006.01)
*G06F 11/34* (2006.01)

(52) U.S. Cl.
CPC ...... *G06F 11/3003* (2013.01); *G06F 11/3096* (2013.01); *G06F 11/3476* (2013.01); *G06F 2201/815* (2013.01); *G06F 2201/835* (2013.01); *G06F 2201/84* (2013.01); *G06F 2201/865* (2013.01)

(58) Field of Classification Search
USPC .......................................................... 714/20
See application file for complete search history.

(56) References Cited

U.S. PATENT DOCUMENTS

| | | | |
|---|---|---|---|
| 2005/0229181 A1* | 10/2005 | Vazeille | G06F 9/542 718/102 |
| 2006/0010440 A1* | 1/2006 | Anderson | G06F 9/45533 718/1 |
| 2009/0089623 A1* | 4/2009 | Neering | G01R 31/3183 714/39 |
| 2010/0058095 A1* | 3/2010 | Malek | G06F 1/12 713/375 |
| 2011/0219208 A1 | 9/2011 | Asaad | |
| 2012/0054408 A1 | 3/2012 | Dong | |
| 2012/0246200 A1* | 9/2012 | Balasubramanian | G06F 21/552 707/809 |
| 2012/0246640 A1 | 9/2012 | Marshall et al. | |
| 2013/0110883 A1 | 5/2013 | Junqueira | |
| 2013/0332660 A1 | 12/2013 | Talagala | |
| 2014/0089264 A1 | 3/2014 | Talagala | |
| 2014/0107995 A1 | 4/2014 | Kostick | |
| 2014/0258777 A1 | 9/2014 | Cheriton | |
| 2014/0298114 A1* | 10/2014 | Aoki | G06F 11/2028 714/48 |
| 2014/0330784 A1 | 11/2014 | Sundaram | |
| 2015/0149238 A1* | 5/2015 | Glustrom | G06Q 10/0633 705/7.27 |
| 2017/0163669 A1* | 6/2017 | Brown | H04L 63/1425 |
| 2017/0344439 A1* | 11/2017 | Howe | G06F 11/1471 |

OTHER PUBLICATIONS

Montesinos, et al.; "DeLorean: Recording and Deterministically Replaying Shared-Memory Multiprocessor Execution Efficiently"; *35th International Symposium on Computer Architecture*; Jun. 21, 2008; Piscataway, NJ; pp. 289-300.

Sarangi, et al.; "CADRE: Cycle-Accurate Deterministic Reply for Hardware Debugging"; *Proceedings of the International Conference on Dependable Systems and Networks*; Jun. 25, 2006; Philadelphia, PA; pp. 301-312.

Xu, et al.; "A 'Flight Data Recorder' for Enabling Full-system Multiprocessor Deterministic Replay"; *Proceedings of the 30th Annual International Symposium on Computer Architecture*; Jun. 9-11, 2003; San Diego, CA; pp. 122-133.

* cited by examiner

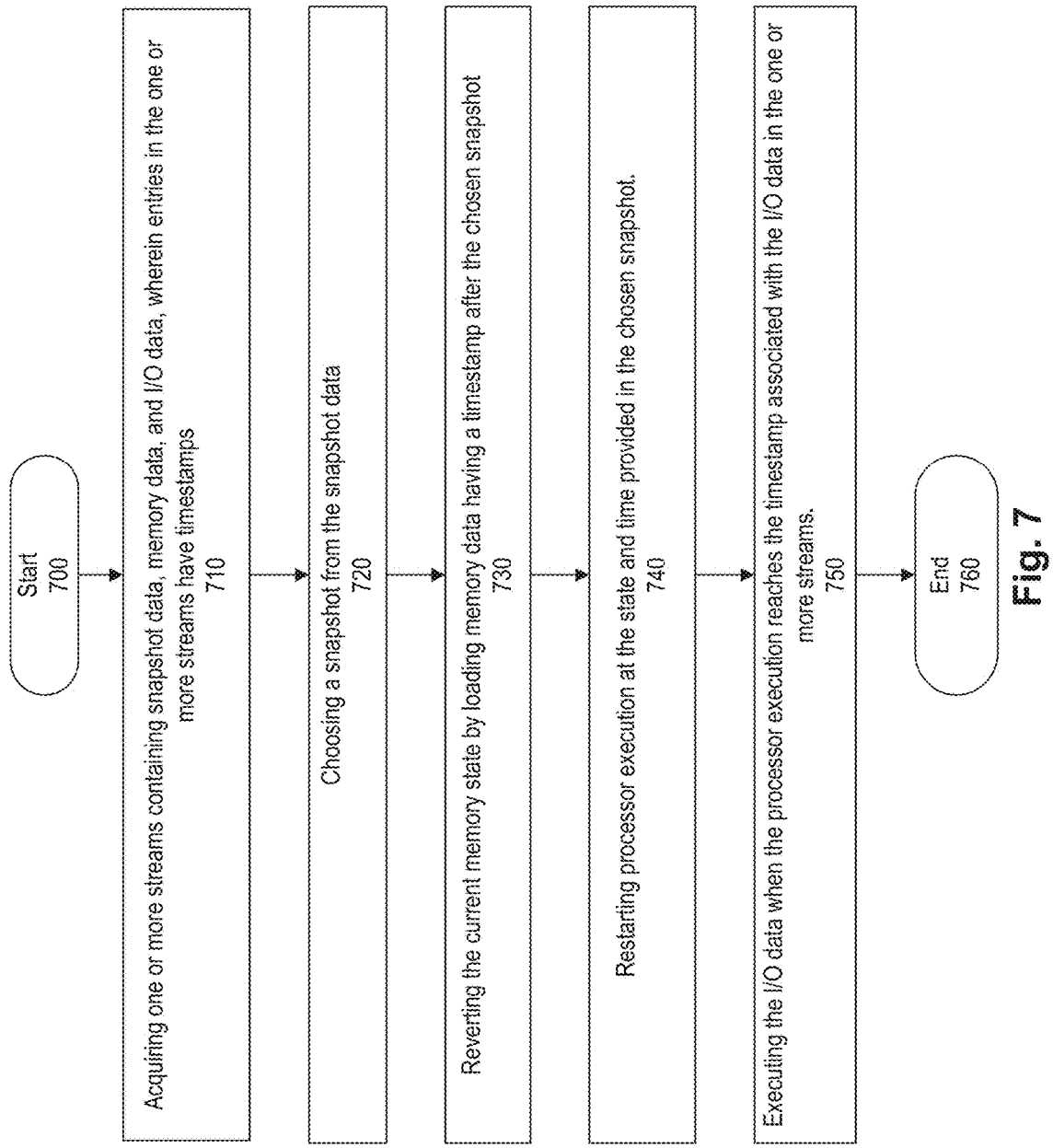

LIVE ROLLBACK FOR A COMPUTING ENVIRONMENT

REFERENCE TO RELATED APPLICATIONS

This application is a continuation of U.S. Non-Provisional patent application Ser. No. 14/557,317, filed on Dec. 1, 2014, the disclosure of which is expressly incorporated herein by reference in its entirety.

BACKGROUND

Modern computing systems are capable of running a large variety of software applications and platforms. Developers write these software applications in a programming language. For example, developers can write an application using C, C++, Objective-C, or Java. The developer can then compile the application into object code or machine code that the processor can directly execute.

While running, the processor can interact with other components of the computer system. For example, the processor may store data in system memory. The processor can access the computers system memory, graphics memory, cache memory, or connected storage devices such as hard disks. Further, the processor can interact with a variety of input/output ("I/O") devices. For example, a keyboard or mouse can provide user input, a graphics monitor can display output from the application, and a network interface can allow the application to send and receive data across the network.

An operating system, such as Microsoft Windows, Linux, or Max OS X, runs on the base hardware providing a platform for additional applications. A developer can write an application to run on a specific operating system. The application can make use of software libraries and functionality built into an operating system to provide access to the underlying hardware components.

Virtualization technologies have become widely used for sharing limited computer hardware resources. In a hardware virtualization environment, sometimes also referred to as a platform virtualization environment, one or more virtual machines can simulate a host computer with its own operating system. In particular, software executed on these virtual machines can be separated from the underlying hardware resources. As a result, multiple virtual machines running on a single host computer can each have its own operating system. For example, a computer that is running Microsoft Windows operating system may host multiple virtual machines: one virtual machine that simulates a computer running a Linux operating system, based on which Linux-based software can be executed; a second virtual machine simulating a computer running a Os X, on which OS X based software can be executed; and additional virtual machines each running its own operating system.

Whether a processor is physical or virtual, the processor can execute a computer program by following each instruction in the compiled software application. When an application is compiled, the program is converted into a sequence of instructions readable by a specific type of processer. The process can execute an instruction cycle for each instruction by loading the instruction into the processor, determining what action the instruction requires, and taking that action. The processor can repeat this cycle for each instruction in the program until the application finishes running.

The instructions executed by the processor can directly affect other aspects of the computing environment. Instructions can write data to memory. Additionally, program instructions can request data from other devices connected to the computer. For example, these devices, generically referred to as input/output devices or I/O devices, can include, a hard disk, keyboard, mouse, or optical drive. The processor can write data to and read data from an I/O device. I/O devices can notify the processor that they have data for the processor. This notification is called an interrupt request ("IRQ"). When the processor receives an IRQ from an I/O device, the processor can interrupt its current execution, read the data from the device, and continue its execution. Additionally, a processor may write data to an I/O device or initiate interaction with an I/O device. Often the processor will request data from the I/O device, wait until the I/O device finishes, and then read the data from the I/O device. Because interacting with an I/O device can sometimes take much longer than other processor tasks, modern processors can use direct memory access ("DMA"). Using DMA, a processor can initiate interaction with an I/O device, can continue executing other instructions while waiting for the I/O device to respond, and can handle the IRQ from the device informing the processor that the request is complete.

The order and result of processor instructions are deterministic. Using the same input data and the same instruction, the same result will occur. This determinism can allow for predictable results when executing application instructions. I/O data, however, is non-deterministic. Reading from an I/O device or the result of an IRQ will not always produce the same result as a previous read or IRQ. Because of their non-deterministic nature, I/O operations are inherently unpredictable. This unpredictability can cause difficulty when trying to determine the processors exact execution history.

There are many practical uses for investigating the past operation and execution of a processor. For example, developers often need to re-run portions of software applications in order to find and fix bugs and errors in the application. Unfortunately, the non-deterministic nature of I/O renders the ability to precisely replay the execution of an application impossible. Because the I/O operations are non-deterministic, a developer cannot guarantee that running the same instructions with the same input and I/O operations will produce the sane error or result. Developers cannot guarantee the exact same execution path when rerunning an application even if the deterministic aspects of the execution remain constant. As a result, debugging specific application failures or errors can be difficult and imprecise.

BRIEF DESCRIPTION OF THE DRAWINGS

Reference will now be made to the accompanying drawings showing example embodiments of this disclosure. In the drawings:

FIG. 7 is a flowchart of an exemplary method for rolling back a system using a stream, consistent with embodiments of the present disclosure.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein provide technologies for replaying the execution of a computing environment from a previous state. These technologies allow for the re-execution of a previously executed process in a deterministic and predictable manner. These technologies can operate in both virtual and non-virtual computing environments. The techniques described herein can allow for the creation of a stream of memory, processor, and input/output data in various formats and can use a stream of memory data, processor state data, and I/O data to replay a system's execution from a previous point in time. The replay techniques described herein can eliminate the difficulty associated with debugging non-deterministic computing environments. Further, the techniques described herein can assist with performance analysis.

Figure 1:
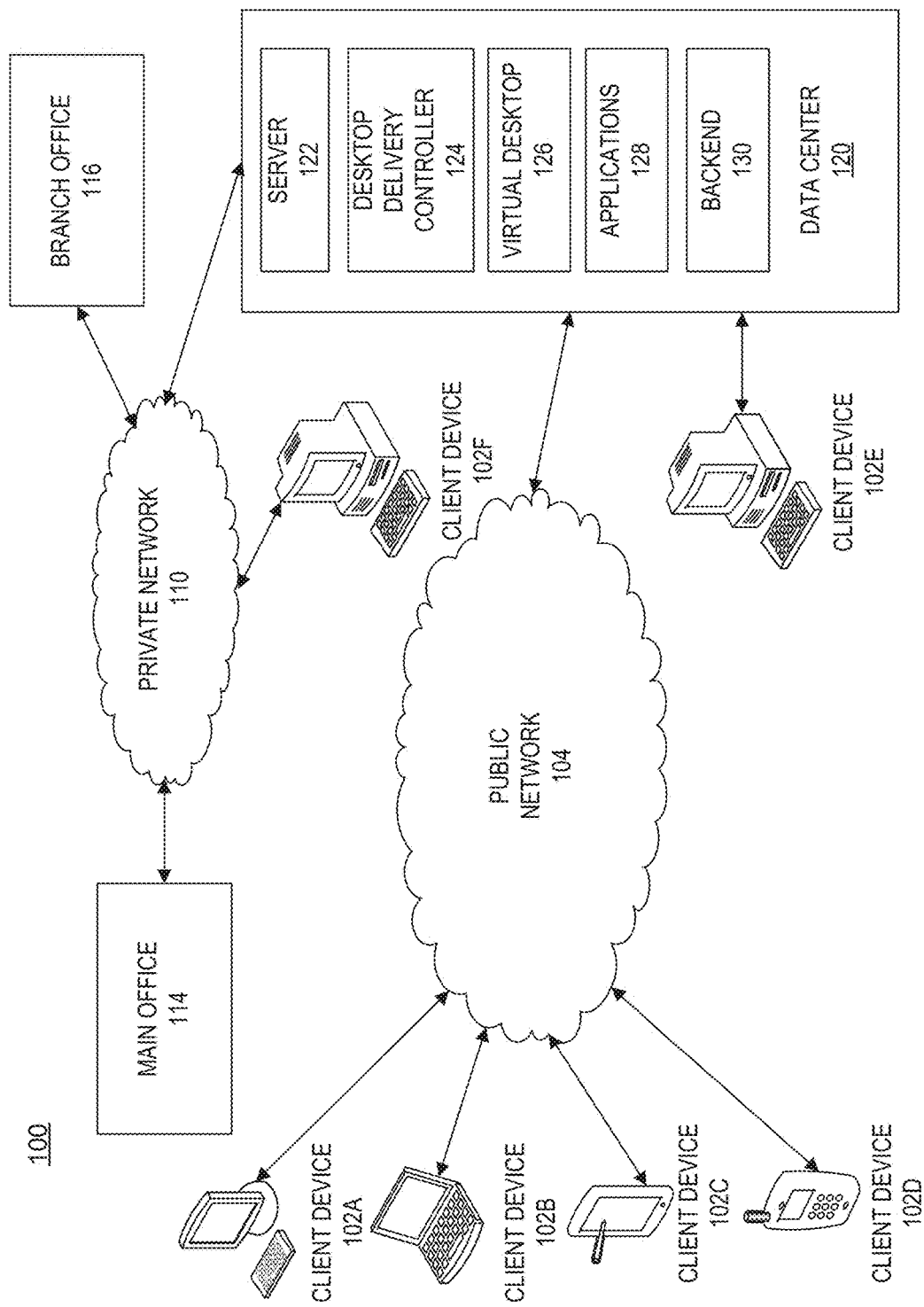
FIG. 1 is a block diagram of an exemplary network environment, consistent with embodiments of the present disclosure.

FIG. 1 is a block diagram of an exemplary network environment 100. While exemplary network environment 100 is directed to a virtual network environment, it is appreciated that the network environment can be any type of network that communicates using packets. Network environment 100 can include one or more client devices 102A-F, a public network 104, a private network 110, a main office 114, a branch office 116, and a data center 120.

One or more client devices 102A-F (collectively as 102) are devices that can acquire remote services from data center 120 through various means. Client devices 102A-F can communicate with data center 120 either directly (e.g., client device 102E) or indirectly through a public network 104 (e.g., client devices 102A-D) or a private network 110 (e.g., client device 102F). In some embodiments, a main office 114 and a branch office 116 can also include one or more client devices that are similar to client devices 102A-F. Main office 114 can be located, for example, in a principal place of business of a company. Branch office 116 can be located, for example, remote to main office 114. In some embodiments, the client devices of main office 114 and branch office 116 can also acquire remote services from data center 120 through, for example, private network 110.

When client device 102 communicates through public network 104 or private network 110, a communication link can be established. For example, a communication link can be established by public network 104, thereby providing a client device (e.g., client devices 102A-D) access to data center 120. A communication link can also be established by private network 110, thereby providing client device 102F, main office 114 and/or branch office 116 accesses to data center 120. While client devices 102A-D are portrayed as a computer (e.g., client devices 102A), a laptop (e.g., client device 102B), a tablet (e.g., client device 102C), and a mobile smart phone (e.g., client device 102D), it is appreciated that client device 102 could be any type of device (e.g., such as a smartwatch) that communicates packets to and from data center 120.

Public network 104 and private network 110 can be any type of network such as a wide area network (WAN), a local area network (LAN), or a metropolitan area network (MAN). As an example, a WAN can be the Internet or the World Wide Web, and a LAN can be a corporate Intranet. Public network 104 and private network 110 can be a wired network, a wireless network, or a combination of both.

Data center can be a central repository, either physical or virtual, for the storage, management, and dissemination of data and information pertaining to a particular public or private entity. Data center 120 can be used to house computer systems and associated components, such as one or physical servers, virtual servers, and storage systems. Data center 120 can include, among other things, one or more servers (e.g., server), a desktop delivery controller 124, a virtual desktop 126, applications 128, and a backend system 130.

Server 122 can be an entity represented by an IP address and can exist as a single entity or a member of a server farm. Server 122 can be a physical server or a virtual server. In some embodiments, server 122 can include a hardware layer, an operating system, a communication subsystem, and a hypervisor creating or managing one or more virtual machines. Server 122 can provide one or more services to an endpoint. These services can include providing one or more applications 128 to one or more endpoints (e.g., client devices 102A-F). For example, one or more applications 128 can include Windows™- or SAP™-based applications and computing resources. Via the communication subsystem, server 122 communicate with other devices (e.g., client devices 102) through various types of networks (e.g., private network 110 and public network 104).

Desktop delivery controller 124 can be a device that enables delivery of services, such as virtual desktops 126 to client devices (e.g., client devices 102A-F). Desktop delivery controller 124 can provide functionality required to manage, maintain, and optimize all virtual desktop communications. In some embodiments, desktop delivery controller 124 can control, manage, maintain, or optimize the provisioning of applications 128.

In some embodiments, one or more virtual desktops 126 can provide one or more applications 128. Virtual desktops 126 can include hosted shared desktops allowing multiple users to access a single shared remote-desktop-services desktop, virtual desktop infrastructure desktops allowing each user to have their own virtual machine, streaming disk images, a local virtual machine, individual applications (e.g., one or more applications 128), or a combination thereof.

Backend system 130 can be a single or multiple instances of computer networking hardware, appliances, or servers in a server farm or a bank of servers. Backend system 130 can interface directly or indirectly with server 122. For example, backend system 130 can include Microsoft™ Active Directory, which can provide a number of network services, including lightweight directory access protocol (LDAP) directory services, Kerberos-based authentication, domain name system (DNS) based naming and other network information, and synchronization of directory updates amongst several servers. Backend system 130 can also include, among other things, an Oracle backend server, a SQL Server backend, and/or a dynamic host configuration protocol (DHCP) server. Backend system 130 can provide data, services, or a combination of both to data center 120, which can then provide that information via varying forms to client devices 102 or branch office 140.

Figure 2A:
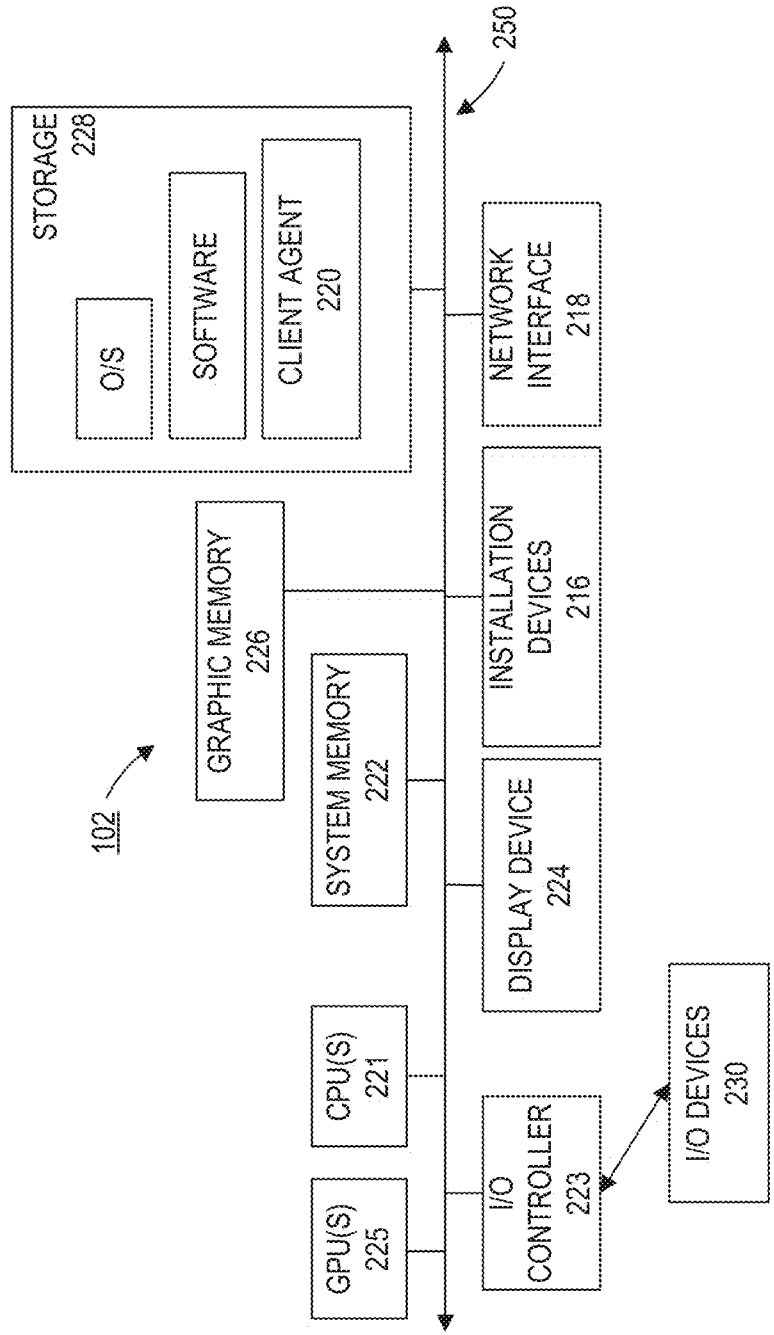
FIGS. 2A-2B are block diagrams of an exemplary computing device, consistent with embodiments of the present disclosure.
Figure 2B:
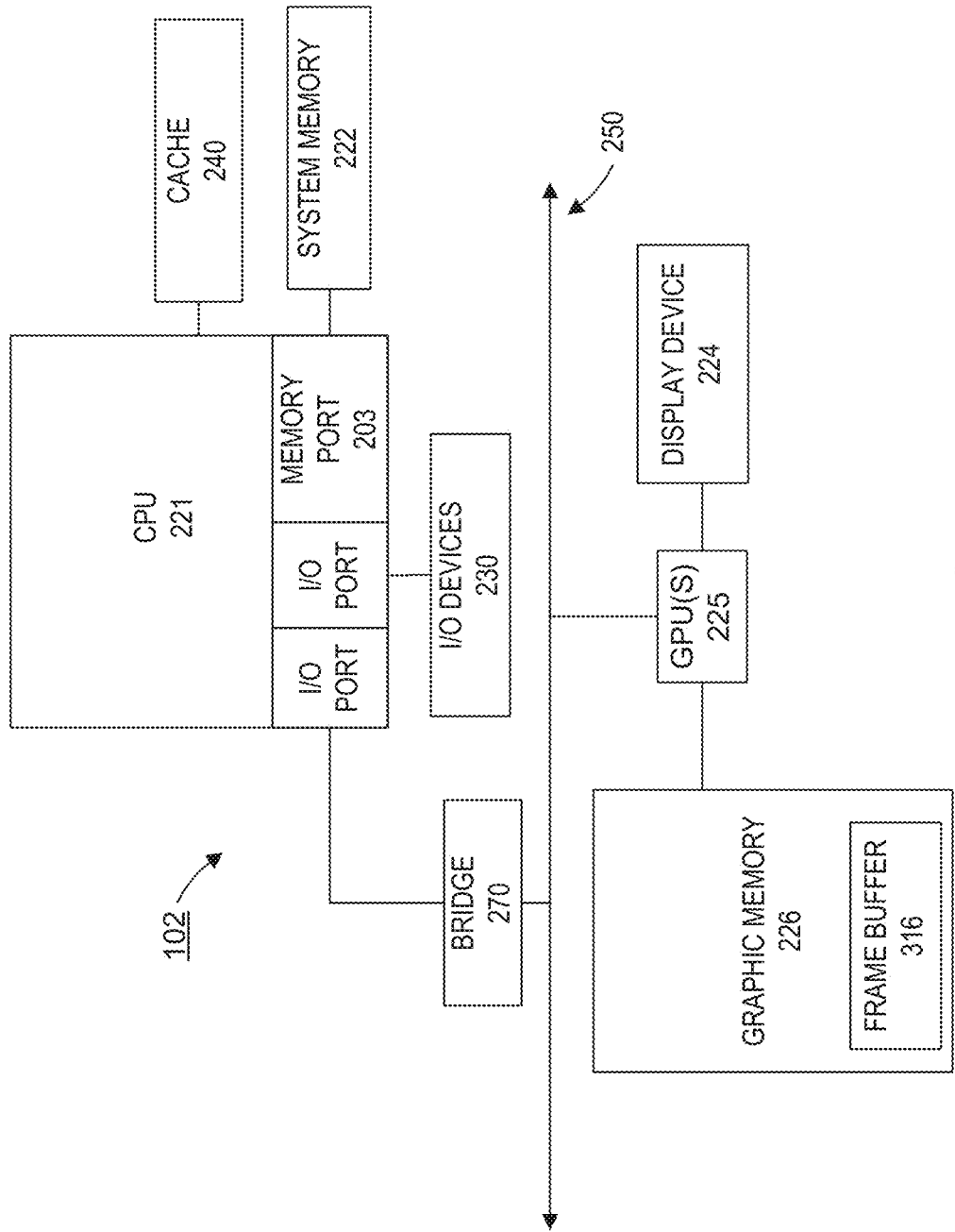

FIGS. 2A-2B are block diagrams of an exemplary client device 102, consistent with embodiments of the present disclosure. As shown in FIG. 2A, each client device 102 can include one or more central processing units (CPUs) 221, one or more graphics processing units (GPUs 225), a system memory 222, and a graphic memory 226. CPUs 221 can be any logic circuitry that responds to and processes instructions fetched from the system memory 222. CPUs 221 can be a single or multiple microprocessors, field-programmable gate arrays (FPGAs), or digital signal processors (DSPs) capable of executing particular sets of instructions stored in a memory (e.g., system memory 222) or a cache (e.g., cache 240). CPUs 221 can also contain a plurality of processor registers for storing variable types of data. For example, these registers can store data, instructions, floating point values, conditional values, and/or addresses for locations in system memory 322. CPU registers can include special purpose registers used to store data associated with the running process such as an instruction pointer, instruction counter, and/or a memory stack pointer.

The system memory 222 can include a tangible non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), processor cache, memory register, or a semiconductor memory. System memory 222 can be one or more memory chips capable of storing data and allowing any storage location to be directly accessed by CPUs 221. System memory 222 can be any type of random access memory (RAM), or any other available memory chip capable of operating as described herein. In the exemplary embodiment shown in FIG. 2A, CPUs 221 can communicate with system memory 222 via a system interface 250.

GPUs 225 can be any type of specialized circuitry that can manipulate and alter memory (e.g., graphic memory 226) to provide and/or accelerate the creation of images stored in a frame buffer (e.g., frame buffer 316 shown in FIG. 2B) for output to a display device (e.g., display device 224). GPUs 225 can have a highly parallel structure making them more effective than general-purpose CPUs 221 for algorithms where processing of large blocks of graphical data can be performed in parallel. Furthermore, the functionality of GPUs 225 can also be included in a chipset of in some other type of special purpose processing unit or co-processor.

CPUs 221 can connect to system memory 222 and system interface 250. CPUs 221 can execute programming instructions stored in the system memory 222, operates on data stored in system memory 222 and communicates with the GPUs 225 through the system interface 250, which bridges communication between the CPUs 221 and GPUs 225. In some embodiments, CPUs 221, GPUs 225, system interface 250, or any combination thereof, can be integrated into a single processing unit. GPUs 225 can be capable of executing particular sets of instructions stored in system memory 222 to manipulate graphical data store in system memory 225 or graphic memory 226. For example, GPUs 225 can receive instructions transmitted by the CPUs 221 and processes the instructions in order to render graphics data stored in the graphic memory 226. Graphic memory 226 can be any memory space accessible by GPUs 225, including local memory, system memory, on-chip memories, and hard disk. GPUs 225 can enable displaying of graphical data stored in graphic memory 226 on display device 224.

Client device 102 can also include display device 224 and an input/output I/O device 230 (e.g., a keyboard, mouse, or pointing device) connected through an I/O controller 223, both of which communicate via system interface 250. It is appreciated that CPUs 221 can also communicate with system memory 222 and other devices in manners other than through system interface 250, such as through serial communication manners or point-to-point communication manners. Similarly, GPUs 225 can also communicate with graphic memory 226 and other devices in manners other than system interface 250. Furthermore, I/O device 230 can also provide storage and/or an installation medium for the client device 102.

FIG. 2B depicts an embodiment of an exemplary client device 102 in which CPUs 221 communicates directly with system memory 222 via a memory port 203, and similarly GPUs 225 communicates directly with graphic memory 226. CPUs 221 can communicate with a cache 240 via a secondary bus, sometimes referred to as a backside bus. In some embodiments, CPUs 221 can communicate with cache 240 via system interface 250. Cache 240 typically has a faster response time than system memory 222. In some embodiments, such as the embodiment shown in FIG. 2B, CPUs 221 can communicate directly with I/O device 230 via an I/O port. In further embodiments, I/O device 230 can be a bridge 270 between system interface 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, a Thunderbolt™ bus, or a Serial Attached small computer system interface bus.

As shown in FIG. 2B, GPUs 225 can also communicate directly with graphic memory 226 and display device 224. GPUs 225 can communicate with CPUs 221 and other devices through system interface 250. Graphic memory 226 can also include a frame buffer 316. Frame buffer 316 can be a graphic output device that drives a display device (e.g., display device 224) from a memory buffer of graphic memory 226 containing a complete frame of graphical data. Frame buffer 316 corn store the final graphic frames, which are to be displayed on display device 224.

As shown in FIG. 2A, client device 102 can support any suitable installation device 216, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive; or any other device suitable for installing software and programs such as any client agent 220, or portion thereof. Client device 102 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, client device 102 can include a network interface 218 to interface to a LAN, WAN, MAN, or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Network interface 218 can comprise a built-in network adapter, network interface card, PCMCIA network card, card bus network adapter, wireless network adapter, USB network adapter, modem or any other device suitable for interfacing client device 102 to any type of network capable of communication and performing the operations described herein.

Figure 3:
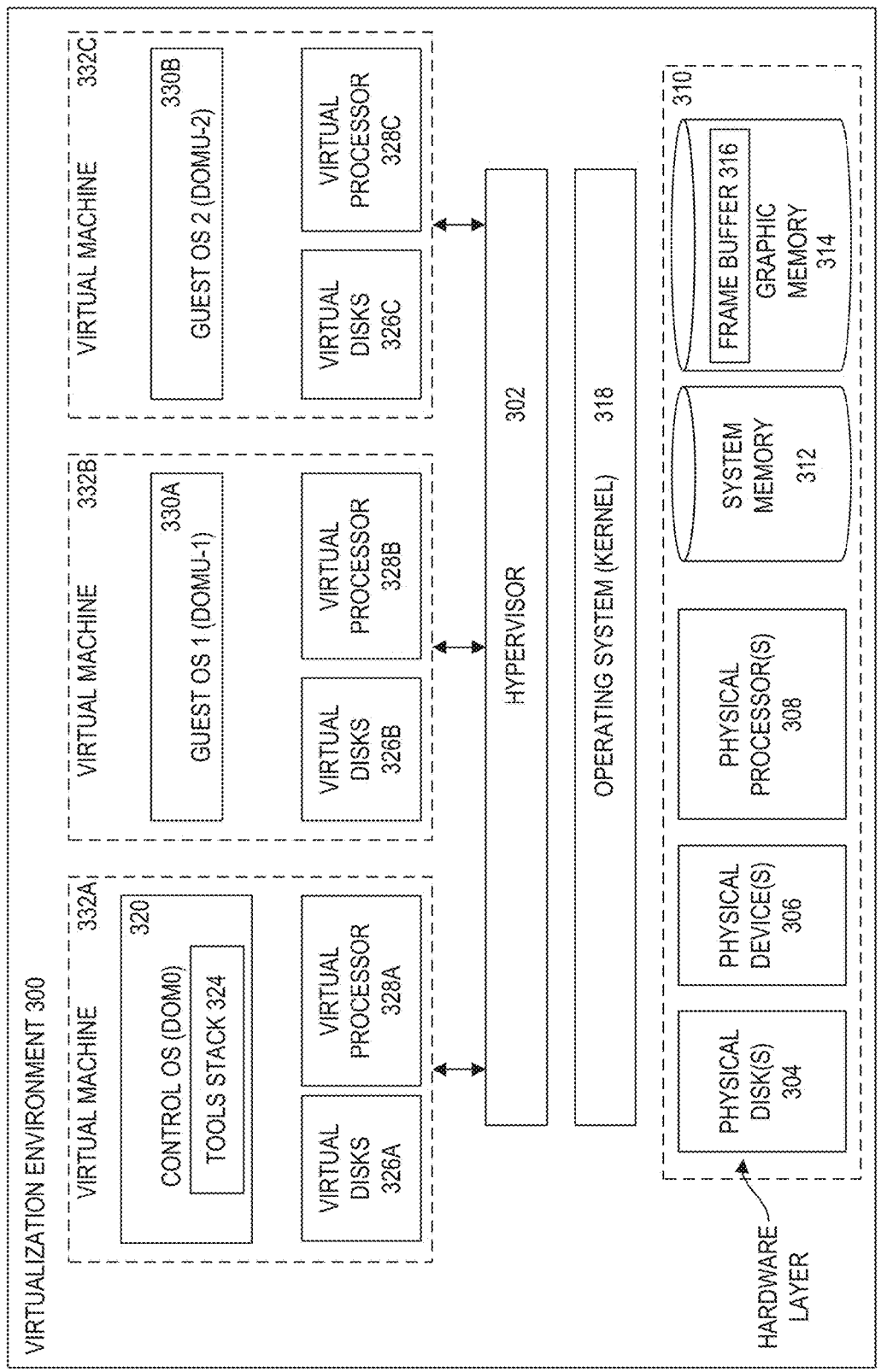
FIG. 3 is a block diagram of an exemplary virtualization environment, consistent with embodiments of the present disclosure.

FIG. 3 is a block diagram of an exemplary virtualization environment 300. In some embodiments, virtualization environment 300 can include a computing device (e.g., client device 102 or server 122). In some embodiments, the modules, programs, virtual machines, and commands stored and executed by virtualization environment 300 can be executed by more than one computing device. For example, virtualization environment 300 can include a server farm.

Virtualization environment 300 can include a hardware layer 310 that can include one or more physical disks 304 (e.g. storage 228), one or more physical devices 306 (e.g., I/O devices 230), one or more physical processors 308 (e.g., CPU 221), a system memory 312 (e.g., system memory 222), and a graphic memory 314 graphic memory 226). In some embodiments, frame buffer 316 can be stored within a memory element in graphic memory 314 and can be executed by one or more of physical processors 308.

Physical disk 304 can be either an internal or an external hard disk. Virtualization environment 300, in some embodiments, can communicate with an external hard disk that is included in the hardware layer 310 as a physical disk 304. Physical devices 306, in some embodiments, can be any combination of devices included in virtualization environment 300 and external devices that communicate with virtualization environment 300. Physical device 306 can be any device such as a network interface card 218, a video card, an I/O device 230 such as a keyboard, a mouse, an input device, speakers, an optical drive, a printer, a scanner, a display device (e.g., a monitor 224)), a storage device (e.g., storage 228), a universal serial bus connection, any device connected to virtualization environment 300, any device communicating with virtualization environment 300, or any other device that is desired. In some embodiments, physical processors 308 can be any processor and can include, for example, CPUs 221 and GPUs 225.

System memory 312 can include any type of memory that can store data, programs, firmwares, or set of executable instructions. Programs, firmwares, or executable instructions stored in system memory 312 can be executed by one or more physical processors 308 of virtualization environment 300. Graphic memory 314 can be any memory space accessible by the physical processors 308, including local memory, system memory, on-chip memories, and hard disk. Physical processors 308 can display certain graphics corresponding to graphical data stored in graphic memory 316 on a display device of physical devices 306.

Virtualization environment 300 can further include an operating system 318 that can be stored in a memory element in system memory 312 and executed by one or more of physical processors 308. Operating system 318 can also be referred to as kernel. Moreover, virtualization environment 300 can include a hypervisor 302. Hypervisor 302 can be a program executed by physical processors 308 in virtualization environment 300 to manage any number of virtual machines. Hypervisor 302 can be referred to as a virtual machine monitor, or platform virtualization software. In some embodiments, hypervisor 302 can be any combination of executable instructions and hardware that monitors virtual machines executing on a computing device. Hypervisor 302 can be stored in a memory element in system memory 312.

Hypervisor 302, in some embodiments, can provide virtual resources to one or more virtual machines, e.g., virtual machines 332A-C. A virtual machine can be a fully-virtualized virtual machine. A fully-virtualized virtual machine can have a guest operating system to allow executing of its software. While running on a host computer, a fully-virtualized virtual machine is unaware that it is a virtual machine. A fully-virtualized virtual machine is sometimes also referred as a Domain U or domU virtual machine virtual machine 332A). A domU virtual machine can be controlled by a control program of another virtual machine. The control program can also be referred to as a control operating system, a control domain, a Domain 0, or dom0. Thus, the virtual machine that runs the control operating system can be referred to as a dom0 virtual machine (e.g., virtual machines 332B-C). In some embodiments, a dom0 virtual machine can have direct access to host computer's hardware resources and thus the control program can be executed by the host computer's operating system. A dom0 virtual machine can have access to the host computer's hardware resources through a hypervisor that either runs directly on the host computer's hardware (i.e., a bare metal hypervisor) or runs within the host computer's operating system (i.e., a hosted hypervisor). In some embodiments, a virtual machine can also be a service domain virtual machine, also referred as a Domain S or domS virtual machine (not shown).

Hypervisor 302, in some embodiments, can provide virtual resources to guest operating systems (domU) 330A-B and/or control operating system (dom0) 320 in any manner such that hypervisor 302 simulates any desirable operating systems (e.g., Windows, Linux, Unix) to execute on virtual machines 332A-C. The system resources can include, for example, hardware layer 310 and any other component included in virtualization environment 300. In these embodiments, hypervisor 302 may be used to emulate virtual hardware, partition physical hardware, virtualize physical hardware, or execute virtual machines that provide access to computing environments. In some embodiments, hypervisor 302 can control processor scheduling and memory partitioning for virtual machines 332A-C executing in virtualization environment 300.

In some embodiments, hypervisor 302 can create virtual machines 332A-C, in which guest operating systems 330A-B or control operating system 320 execute, respectively. As an example, hypervisor 302 can load a virtual machine image to create a virtual machine 332. As another example, hypervisor 302 can execute guest operating systems 330A and 330B within virtual machines 332B and 332C, respectively. Guest operating systems 330A-B are further described in details below.

As shown in FIG. 3, in some embodiments, hypervisor 302 of virtualization environment 300 can be a host hypervisor, or a hypervisor that executes within an operating system (kernel) 318 executing on virtualization environment 300. As a host hypervisor, hypervisor 302 can execute within operating system 318. And virtual machines 332A-C execute at a level above hypervisor 302. If hypervisor 302 is a host hypervisor, operating system 318 can be referred to as a host operating system, while the other operating systems (e.g., operating systems 330A-B) can be referred to as guest operating systems. Guest operating systems 330A-B can execute on virtual machines 332B-C (or domU virtual machines).

In some embodiments, hypervisor 302 of virtualization environment 300 can be a bare metal hypervisor, or a hypervisor that has direct access to all applications and processes executing in the host computing device (e.g., client device 102), all resources on the host computing device, and all hardware on the host computing device (e.g., the hardware layer shown in FIG. 3) or communicating with the host computing device. While a host hypervisor accesses system resources through a host operating system (e.g., operating system 318), a bare metal hypervisor can directly access all system resources. For example, if hypervisor 302 is a bare metal hypervisor, it can execute directly on one or more physical processors 308, and can include program data stored in the system memory 312 and graphic memory 314.

In a virtualization environment that employs a bare metal hypervisor configuration, the host operating system can be executed by one or more virtual machines 332. Thus, a user of the computing device can designate one or more virtual machines 332 as the dom0 virtual machine (e.g., virtual machine 332A). This dom0 virtual machine can imitate the host operating system by allowing a user to interact with the computing device in substantially the same manner that the user would interact with the computing device via host operating system 318.

In some embodiments, virtualization environment 300 can host or execute one or more virtual machines 332A-C. As described above, a virtual machine executing a control operating system can be referred to as a dom0 virtual machine, and a guest virtual machine can be referred as a domU virtual machine. A virtual machine 332 can be a set of executable instructions that, when executed by physical processors 308, imitate the operation of a physical computing device such that programs and processes can be executed on virtual machine 332 in a manner similar to that on a physical computing device. It is appreciated that virtualization environment 300 can host any number of virtual machines 332. In some embodiments, each virtual machine 332 can be provided, such as by hypervisor 302, with a unique virtual view of the physical hardware, memory, processor, and other system resources available to that virtual machine 332. The unique virtual view can be based on, for example, virtual machine permissions, application of a policy engine to one or more virtual machine identifiers, the user accessing a virtual machine, the applications executing on a virtual machine, networks accessed by a virtual machine, or any other desired criteria. In some embodiments, each virtual machine 332 can be provided with a substantially similar virtual view of the physical hardware, memory, processor, and other system resources available to the virtual machines 332.

As shown in FIG. 3, virtual machines 332A-C can include one or more virtual disks 326A-C (collectively as 326). Virtual disks 326 can correspond to, for example, one or more physical disks or a portion of a physical disk (e.g., physical disks 304). As an example, virtual disk 326A can be allocated a first portion of physical disks 304 virtual disk 326B can be allocated a second portion of physical disks 304; and virtual disk 326C can be allocated a third portion of physical disks 304. In some embodiments, one or more of virtual disks 326A-C can include disk partitions and a file system, similar to those of a physical disk. For example, virtual disk 326A can include a system disk, which includes disk partitions and system files associated with virtual machine 332A. In some embodiments, the system disk can be shared among virtual machines. For example, virtual machines 332B and 332C can have the same or similar system disk.

The file systems of virtual disks 326A-C can also include files and folders. For example, virtual disk 326A can also include a user disk, which can store user data such as user files and folders. The user data stored on a user disk is also referred to as persistent user data. In some embodiments, the system disk and/or the user disk of a virtual machine of a client device (e.g., client device 102) can be synchronized with the corresponding disks stored in a server (e.g., server 122). The synchronization of system disk and/or the user disk between the server and the client device can include, for example, updating the system disk to a newer version published by the server and providing backup of the user disk. The synchronization is further described in detail below. In some embodiments, a virtual disk can also include a local disk. The local disk can store local data associated with a virtual machine (e.g., virtual machine 332B). The local disk can also include persistent user data. In some embodiments, the persistent user data stored on a local disk cannot be synchronized with a server.

A virtual disk (e.g., virtual disks 326) can be accessed, modified, updated, or provisioned by a client device or a server. As an example, as described above, when the server publish a new version of the system disk, the server can update the system disk by sending the differences between the new version d the current version to the client device. Moreover, by using the system disk, the server can enable desktop management and patching of the client device. Furthermore, the client device can modify its user disk by writing new data to, or modifying existing data stored on, the user disk. In some embodiments, a virtual disk can be stored as a virtual disk file having a format such as a VHD format, VHDX format, VMDK format, qcow format, qcow2 format, virtual box virtual disk image (VDI) format, and parallels virtual hard disk drive (HDD) format, or a binary format. In some embodiments, a virtual disk can include one or more sectors. A sector can include a number of bytes. For example, a sector can have a size of 512 bytes. Moreover, in some embodiments, one sector or a group of sector can form a block of the virtual disk.

In some embodiments, virtualization environment 300 can also include virtual apertures (not shown) in a virtual memory space, which can be a virtual view of the virtual memory available to virtual machines 332. The virtual apertures can correspond to for example, caches, buffers, physical memories such as system memory 312, and graphic memory 314, internal or external physical disks such as hard disk 304. As an example, under the circumstances that applications running on virtual machine 332A do not require memory more than that is available in system memory 312; the virtual apertures of virtual machine 332A can correspond to a portion of system memory 312. As another example, under the circumstances that applications executed by virtual machine 332B requires memory more than that is available in system memory 312, the virtual apertures of virtual machine 332B can correspond to one or more portions of system memory 312, graphic memory 314, or even one or more portions of physical disks 304. The virtual apertures can be generated, provided, and managed by hypervisor 302.

Virtual processors 328A-C (collectively as 328) can be a virtualized view of one or more physical processors 308 of virtualization environment 300. In some embodiments, the virtualized view of the physical processors 308 can be generated, provided, and managed by hypervisor 302. In some embodiments, virtual processor 328 can have substantially the same characteristics as those of physical processors 308. In some embodiments, virtual processors 328 can provide a modified view of the physical processors 308 such that at least some of the characteristics of virtual processor 328 are different from the characteristics of the corresponding physical processors 308. In some embodiments, virtual processors 328 can provide additional functionality or characteristics that are not available in the corresponding physical processors 308. For example, virtual processors 328 can provide additional registers for use by hypervisor 302 or virtual machines 332.

In FIG. 3, control operating system 320 can execute at least one application for managing and configuring the guest operating systems (domUs 330, e.g., domU-1 330A and domU-2 330B) executing on the virtual machines 332. In some embodiments, control operating system 320 can be referred to as control domain 320, domain 0 320, or dom0 320. While FIG. 3 shows that control operating system 320 is included in virtual machine 332A, control operating system 320 can be executed within any control virtual machine or any dom0 virtual machine, can be executed by hypervisor 302, or can be executed by operating system 318 executing hypervisor 302. Control operating system 320 can execute a administrative application or program that can further display a user interface, which administrators can use to access the functionality of each virtual machine 332 and/or to manage each virtual machine 332. In some embodiments, the user interface generated by the administrative program can be used to terminate the execution of virtual machines 332, allocate resources to virtual machines 332, assign permissions to virtual machines 332, or manage security credentials associated with virtual machines 332.

Moreover, in some embodiments, control operating system 320 can start new virtual machines 332 or terminate execution of virtual machines 332. Control operating system 320 can also directly access hardware and/or resources within the hardware layer 310. In some embodiments, control operating system 320 can interface with programs and applications executing within the context of a virtual machine 332. Control operating system 320 can also interface with programs and applications executing on the computing device in virtualization environment 300 that are outside of the context of a virtual machine 332.

Furthermore, in some embodiments, control operating system 320 can also interact with one or more guest operating systems 330. Control operating system 320 can communicate with guest operating systems 330 through hypervisor 302. As an example, guest operating systems 330 can communicate with control operating system 320 via a communication channel established by the hypervisor 302, such as via a plurality of shared memory pages made available by the hypervisor 302. In some embodiments, control operating system 320 can also include a network back-end driver (not shown) for communicating directly with networking hardware provided by virtualization environment 300. The network back-end driver can process at least one virtual machine request from at least one guest operating system 330. Control operating system 320 can also include a block back-end driver for communicating with a storage element included in virtualization environment 300, such as system memory 312 and graphic memory 314. In some embodiments, the block back-end driver can read and write data from the storage element based upon at least one request received from a guest operating system 330.

Control operating system 320 can also include a tools stack 324, which can provide functionality for interacting with the hypervisor 302. Tools stack 324 can include customized applications for providing improved management functionality to an administrator of a virtual machine farm. In some embodiments, at least one of tools stack 324 and control operating system 320 can include a management application programming interface (API) that provides an interface for remotely configuring and controlling virtual machines 332 running in virtualization environment 300.

As shown in FIG. 3, in some embodiments, guest operating systems 330 can provide users of virtualization environment 300 with access to resources within a computing environment. Such resources can include programs, applications, files, executable instruction codes, desktop environments, computing environment, or other resources made available to users of virtualization environment 300. In some embodiments, the resource can be delivered to virtualization environment 300 via a plurality of access methods including conventional direct installations in virtualization environment 300 or delivery via a method for application streaming. The resource can also be delivered to virtualization environment 300 via access methods such as delivery of output data generated by an execution of the resource on another computing device and communicated to virtualization environment 300 via a presentation layer protocol, delivery of output data generated by execution from a removable storage device connected to virtualization environment 300, and delivery of output data generated by execution via a virtual machine executing in virtualization environment 300.

Figure 4A:
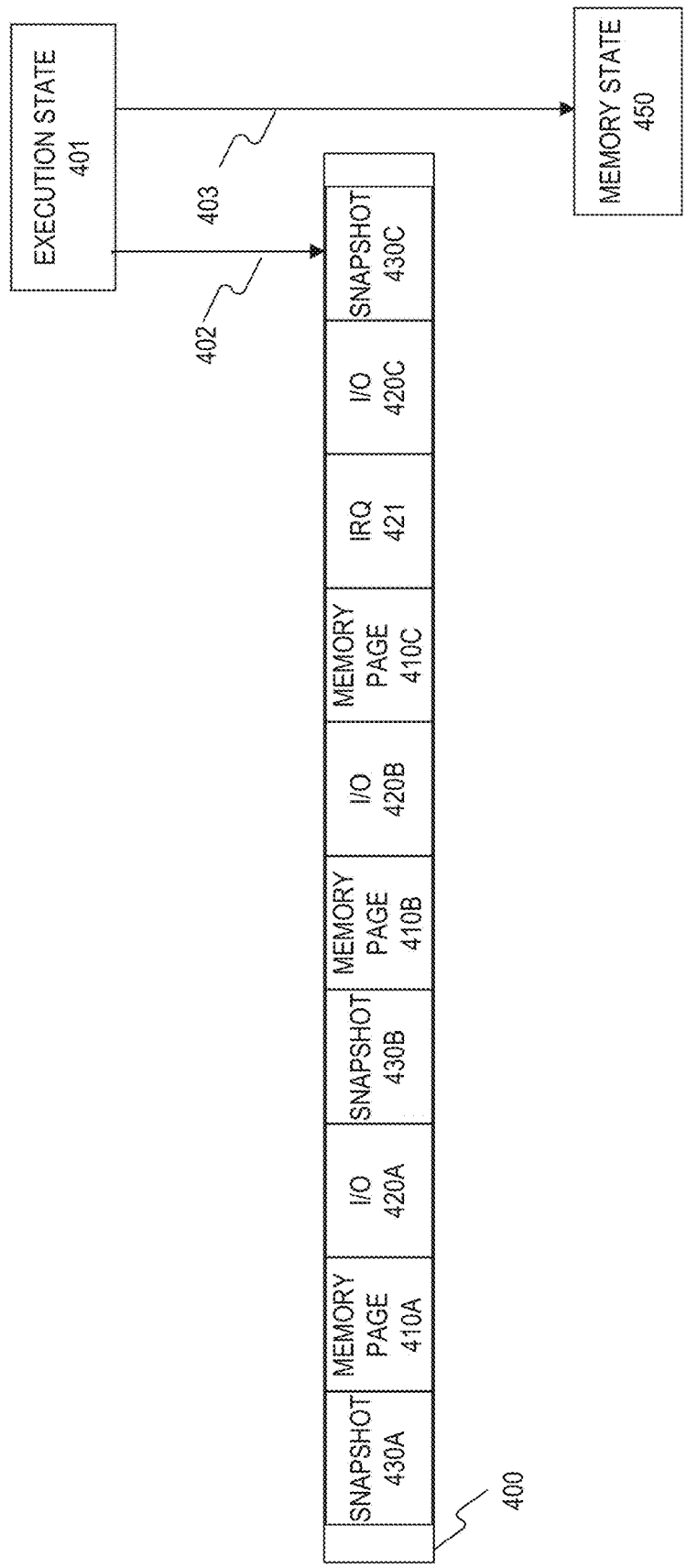
FIGS. 4A-4C are block diagrams illustrating a stream and process for providing rollback capability, consistent with embodiments of the present disclosure.
Figure 4B:
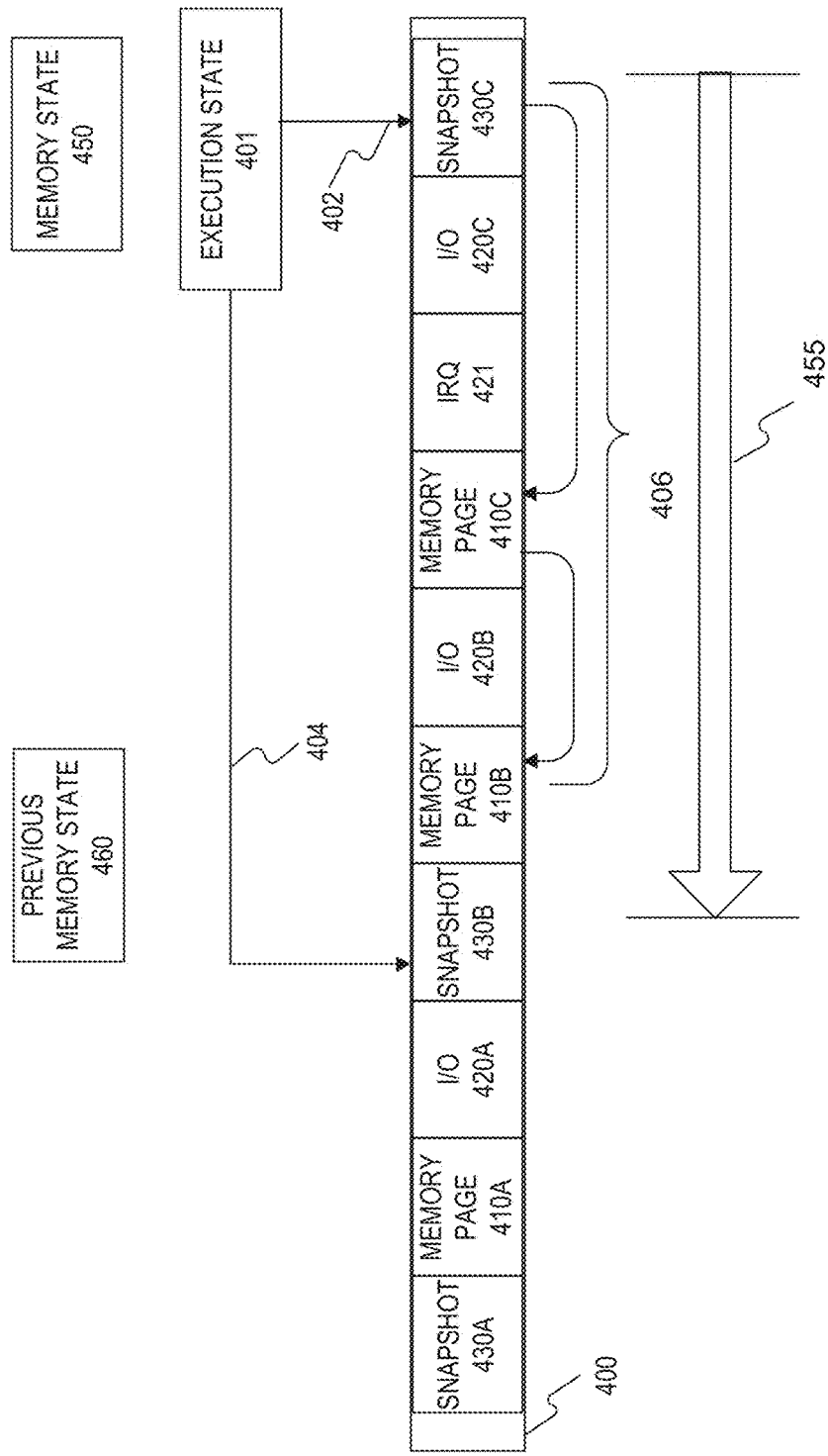
Figure 4C:
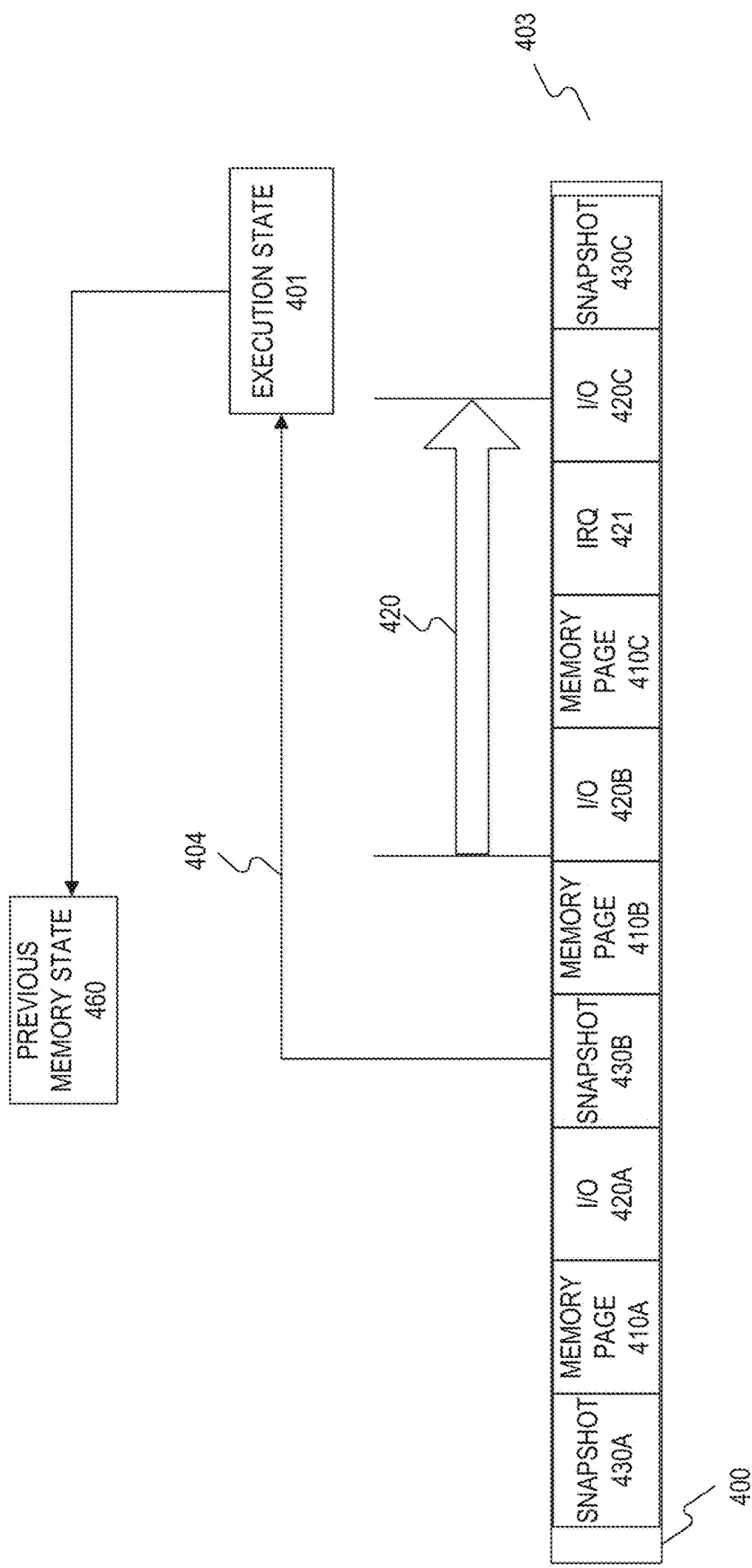

FIGS. 4A-4C are block diagrams of an exemplary stream 400 and an exemplary rollback process, consistent with embodiments of the present disclosure. A computing environment can use a stream (e.g., stream 400) to revert to an earlier processor state (e.g., execution state 401) and memory state (e.g., memory state 450). After this rollback, the processor execution can start from the time of the restored state, and the stream can provide additional information (e.g., I/O data 420 and IRQ data 421) to replay the processor execution. In some embodiments, a hypervisor (e.g., hypervisor 302) can control the rollback process. It is appreciated that any process or mechanism that can read the stream (e.g., stream 400) and control the memory state (e.g., memory state 450) and processor execution state (e.g., execution state 401) can implement the rollback process. For example, the rollback capability can be provided by a kernel (e.g., kernel 318), a bare-metal or hosted hypervisor (e.g., hypervisor 302), or a virtual machine (e.g., virtual machines 332).

FIG. 4A is an exemplary stream 400 and execution state 401. Stream 400 can contain a plurality of entries for use by the disclosed embodiments. Each of the entries in the stream can contain information data associated with the specific type of entry in the stream. As illustrated in the exemplary embodiment, entries in stream 400 can contain snapshot data 430A-C, memory data such as memory pages 410A-D, and I/O data including I/O requests 420A-C and interrupt requests ("IRQ") 421. Each entry in the stream can include a timestamp. The timestamp can be any metric that indicates when in the execution history the associated entry or event was created. For example, the timestamp can be the value of the retired instruction counter of the processor. In some embodiments, the timestamp value can be provided by a virtual machine or hypervisor (e.g., a retired guest instruction counter).

In some embodiments, the computing environment can determine an omitted timestamp for an entry using other entries in the stream. In these embodiments, an entry in stream 400 that does not require an exact execution time, but rather only requires that the entry maintain relative order with other entries in the stream, can be inserted into the stream without a timestamp. In these embodiments, when a computing environment reads an entry without a timestamp from the stream, the computing environment can determine the timestamp using the timestamp of either previous or subsequent entries depending on the nature of the recorded entry. For example, the exact rime of an I/O write can be ignored as long as the I/O write occurs before the next I/O read for the same device. In this example, the timestamp for the entry recording the I/O write can be omitted. When a computing environment acquires or reads the stream, the computing environment can determine a timestamp for the I/O write as where the timestamp occurs before the tiniest associated with the subsequent I/O read. In this example, each entry has a constructive timestamp even though the underlying stream can omit certain timestamps.

Stream 400 can be stored in a memory (e.g., system memory 322). The memory can include a tangible non-transitory computer-readable medium, such as a flexible disk, a hard disk, a CD-ROM (compact disk read-only memory), a CD-RW (compact disk re-writable memory), MO (magneto-optical) drive, a DVD-ROM (digital versatile disk read-only memory), a DVD-RAM (digital versatile disk random-access memory), DVD-RW (digital versatile disk re-writable memory), a processor cache, memory register, or a semiconductor memory. Further, the memory can be directly attached or can be accessible through a network (e.g., a NAS (network-attached storage), a SAN (storage area network), cloud or internet based storage, or a memory attached to a remote computing device). It is appreciated that production of a stream can require that the stream is stored on at least a writeable medium while use of an existing stream requires that the stream is stored on at least a readable medium.

In some embodiments, stream 400 can be split into multiple streams stored on the same or different media. In these embodiments the stream can be split based on arbitrarily determined criteria (e.g., the type of data, the timestamp range, the size of the stream). When using multiple streams, the computing environment can read from all streams during the rollback and replay process. An example of the multiple streams embodiments is further described below with respect to FIG. 5.

Referring back to FIG. 4A, stream 400 can contain memory data (e.g., memory pages 410A-D). Memory data can be the existing contents of a specific area of memory prior to the processor execution updating that area of memory. In some embodiments, the stream includes memory ages 410 to preserve the memory data. In some embodiments, the stream includes the first update to a memory location after a snapshot. In these embodiments subsequent updates to the same memory location are not included in the stream until after an additional snapshot.

Stream 400 can contain I/O data. I/O data can include data related to any I/O transactions (e.g., I/O reads 420, IRQs 421, or DMA operations) the processor handles. I/O data can contain any information necessary to recreate the recorded I/O transaction. For example, an I/O read 420 entry can contain the device involved and the value returned from the device while a DMA operation can include information related to the initiation of the transfer and the IRQ result.

Stream 400 can contain snapshot data 430. Snapshot data can record the processor state (e.g., execution state 401). The processor state can include the values of the processor registers, the values of the processor counters, the execution location, memory tables, and/or any other data that defines the then existing state of the processor. The snapshot can contain all information necessary to return execution state 401 to a specific point during the prior execution of a process.

The elements of stream 400 can be organized in multiple ways. In some embodiments, the entries in the stream can be stored chronologically and the rollback process can scan each entry of stream 400 to determine the type of the entry. In some embodiments, a snapshot (e.g., snapshot 430C) can include a reference to the previous snapshot (e.g., snapshot 430B) and/or a previous memory entry (e.g., memory page 410C). A memory entry (e.g., memory page 410C) can include a reference to a previous memory entry (e.g., memory page 410B) and/or previous snapshot (e.g., snapshot 430B). For example, snapshot 430C can include a reference to the location in the stream of snapshot 430B. Further, for example, snapshot 430C can reference memory page 410C, memory page 410C can reference memory page 410B, and memory page 410B can reference snapshot 430B, to create a linked list of all memory pages between snapshot 430C and snapshot 430B providing a mechanism for traversing the snapshots 430 and memory pages 410 in the stream. In some embodiments, each entry can contain a reference to the previous entry or the previous entry of the same type. By using these references, these embodiments can create linked lists allowing for efficient traversal of the relevant stream entries during a rollback process.

Execution state 401 represents the current execution state of the computing environment. Execution state 401 can contain a last-entry reference 402 to the most recent stream entry (e.g., snapshot 430C) and a memory-state reference 403 to the current memory state 450. Execution state 401 can include aspects of the processor state necessary to execute instructions for the running process. For example, execution state 401 can include the current values of the various CPU registers. When the processor begins executing, the results of the executed instructions can update the execution state. The execution state can represent the processor state of both a physical CPU and a virtual CPU. In some embodiments, execution state 401 can contain information on a subset of the processer state, but that subset of information can be sufficient to execute the running process.

FIG. 4B is an exemplary stream 400 and diagram of an exemplary rollback of the memory state 450. Before initiating a rollback, the computing environment must choose a snapshot 430 to use as the rollback point. The snapshot choice can be arbitrarily or systematically made. In some embodiments, an operator of the computing environment can manually determine the snapshot 430 for the rollback. In some embodiments, the system or user can choose the most recent snapshot (e.g., snapshot 430C in stream 400) for the rollback. In some embodiments, the computing environment can systematically decide which snapshot the system should use based on externally definable criteria or an algorithm. For example, the computing environment can default to the most recent snapshot, a snapshot based on a pre-determined period of time, or a snapshot based on a configuration setting. Once chosen, the computing environment can use the snapshot during the memory and execution state rollback.

As shown in FIG. 4A, execution state 401 can contain a last-entry reference 402 to the most recent snapshot or memory entry in the stream (e.g., snapshot 430C) and a rollback-snapshot reference 404 to the chosen snapshot (e.g., snapshot 430B). Beginning with snapshot 430C, the rollback process can follow the backwards references (406) contained in the stream 400 entries. Snapshot 430C can reference memory page 410C. When memory page 410C is reached by the rollback process, the memory page can be loaded into current memory state 450. The rollback process can than follow the backward reference of memory page 410C to memory page 410B. The rollback process can load memory page 410B into the current memory state and continue following the backwards references to 430B. Because snapshot 430B is the desired snapshot, the rollback process can stop following further references. In some embodiments, the rollback process will continue across multiple instances of memory pages and snapshots before reaching the desired snapshot. By loading each recorded memory page between the initial memory state 450 and snapshot 430B, the rollback process can replace the values of memory state 450 with the values stored in the stream. This process results in memory reversion 405. Memory reversion 405 represents the reversion of memory state 450 into previous memory state 460. Memory state 460 can then represent the memory state as it existed at the time of snapshot 430B. It is appreciated that one of ordinary skill would recognize additional embodiments for locating memory entries in the stream. These additional embodiments are consistent with the present disclosure of reverting a current memory state (e.g., memory state 450) to a previous memory state (e.g., previous memory state 460) based on the memory data stored in a stream (e.g., stream 400).

FIG. 4C is an exemplary stream 400 and diagram of an exemplary loading of execution state and replay of I/O operations. The rollback process can reset the execution state 401 to the same state that existed at the time of snapshot 430B. The computing environment can read the snapshot data (e.g., register values, instructions, and/or memory references stored in snapshot 430B) and load (404) that data into the execution state 401. By loading the values of snapshot 430B into execution state 401, the computing environment can recreate the state existing at the time of snapshot 430B in execution state 401.

In some embodiments, the execution state 401 can be reverted to the values in snapshot 430B before the memory is reverted to previous memory state 460. In some embodiments, the memory reversion to previous memory state 460 can precede the reversion of execution state 401 to the values in snapshot 430B. After the memory and execution state reversion, the execution cycle can be restarted. As the running process executes, the computing environment can intercept all I/O requests made by the executing process and can replace the resulting events with the I/O data recorded in stream 400. The computing environment can monitor the timestamp associated with the running process and the timestamps of the I/O events in stream 400. When a timestamp of an I/O event (e.g., events 420B, 421, and 420C) in stream 400 is reached by the executing process, the computing environment can provide the associated I/O event from the stream.

As the running process executes, the timestamp of execution state 401 can progress (420) forward from the original timestamp of snapshot 430B reaching the I/O events stored in stream 400. For example, when the timestamp of execution state 401 reaches the timestamp of I/O event 420B, the computing environment can read I/O event 420B from the stream and provide it to the executing processor (e.g., execution state 401). The processor can continue to execute instructions and when the timestamp of execution state 401 reaches the timestamp of IRQ 421, the computing environment can provide IRQ 421 from stream 400 to the executing process. This cycle can continue providing all I/O events (e.g., events 420B, 421, and 420C) stored in stream 400 to the executing process at the exact point the events originally occurred. The process can continue to run until interrupted (e.g., by the user or a program error) or until all I/O events in stream 400 have been provided to the executing process. By providing a deterministic replay of the entire execution history, the computing environment can allow for a deterministic replay of past processor execution. This ability can have a variety of applications. For example, a user can replay the past process execution to investigate a bug in the process, or a user can monitor the past process execution to monitor the performance of various instructions or operations.

Figure 5:
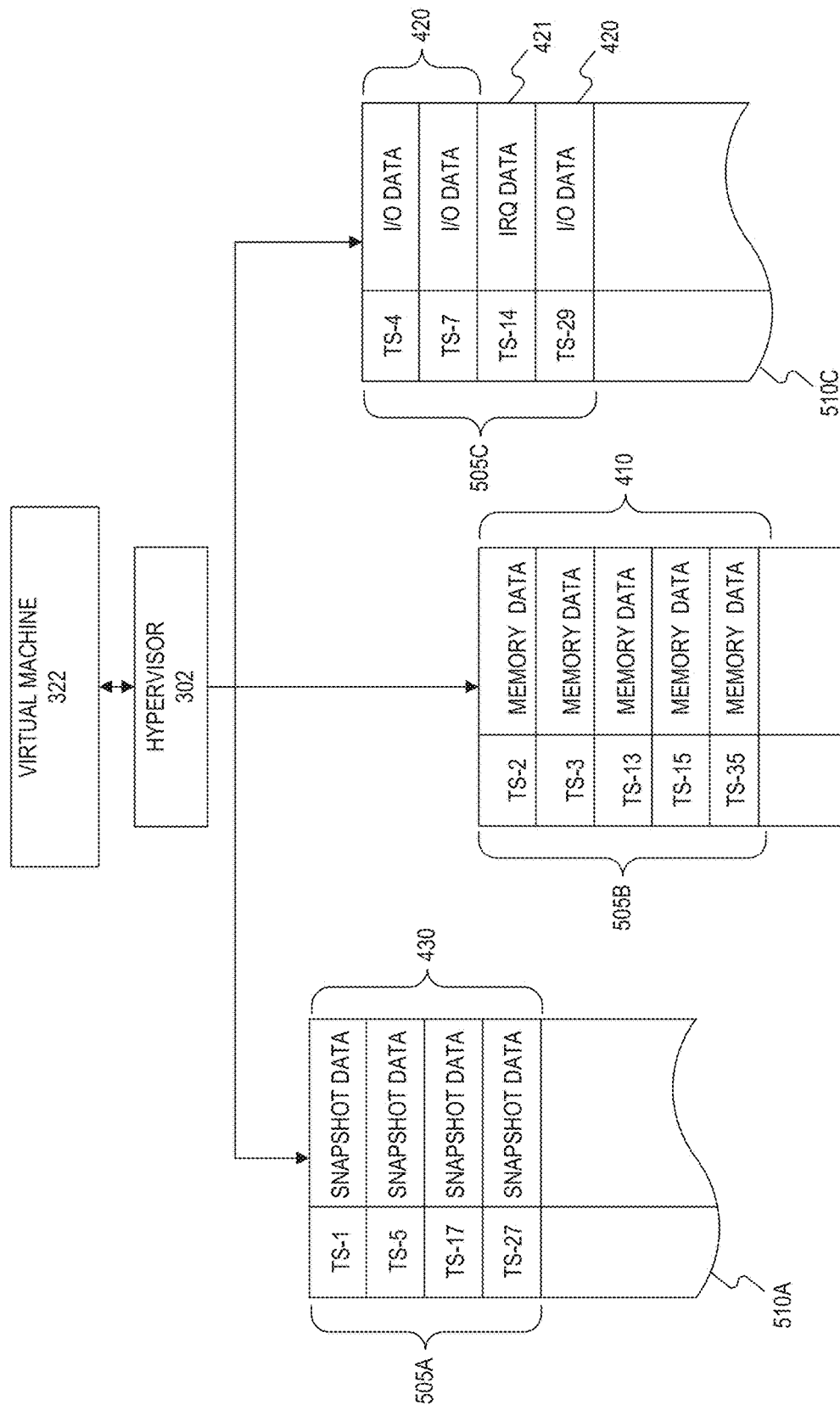
FIG. 5 is a block diagram of an exemplary structure for storing stream information, consistent with embodiments of the present disclosure.

FIG. 5 is an exemplary stream structure created by hypervisor 302. Hypervisor 302 can host virtual machine 322. Virtual machine 322 can contain a guest operating system (e.g., guest operating system 330) executing on a virtual processor (e.g., virtual processor 328). Hypervisor 302 can provide a channel between virtual machine 322 and hardware components and devices such as physical processor (e.g., processor 308) or physical I/O devices (e.g., physical disks 304, physical devices 308, system memory 312, and/or graphic memory 314). Hypervisor can monitor the activities of virtual machine 322 and can create streams 510 based on the activities of virtual machine 322. Stream 510A can contain snapshot data 430 associated with timestamps 505A. Stream 510B can contain memory data 410 associated with timestamps 505B. Stream 510C can contain I/O data 420 and IRQ data 421 associated with timestamps 505C. In some embodiments, all of the data recorded in the streams can exist in one stream or a plurality of streams. Hypervisor 302 can write events to streams 510 as the events occur on virtual machine 322. When hypervisor records an event in streams 510, the hypervisor can also record a timestamp 505. In some embodiments, the timestamp will correspond to processor instruction counter that represents the number of instructions run by virtual machine 322. It is appreciated that one of ordinary skill in the art could recognize that hypervisor 302 can be replaced with any hardware or software mechanism that can monitor the memory, processor execution, and I/O devices associated with a computing environment and is not limited to a hypervisor such as hypervisor 302 or virtual machine such as virtual machine 322.

Hypervisor 302 can include a repeating timer. When the timer finishes, hypervisor 302 can create a snapshot 430 and timestamp 505A in stream 510A resulting in snapshots 430 created at regular intervals. When a snapshot is created, hypervisor can further mark all memory as copy-on-write or read-only. After the snapshot is created, when virtual machine 322 attempts to write to memory, a copy-on-write or read-only exception can occur. Hypervisor 302 can capture this exception, copy the affected memory data 410 and the current timestamp 505B into stream 510B, and mark the memory location as read/write to prevent further interruption. This process can allow the computing environment to efficiently create a stream that does not contain duplicate memory pages or memory entries between snapshots. In some embodiments, hypervisor can record all memory writes to the stream and not mark memory as read-only or copy-on-write.

Any time virtual machine 322 makes an I/O request, hypervisor 302 can monitor the request, create an I/O data 420 and timestamp 5050 entry in stream 510Cd. When an I/O device triggers IRQ, hypervisor 302 can intercept the IRQ, create an IRQ 421 and timestamp 505C entry in stream 510C, and forward the IRQ to virtual machine 322. Through this process hypervisor 302 can create streams 510 categorized by type but still temporally organized according to timestamps 505. In some embodiments the snapshot data 430, memory data 410, I/O data 420, and IRQ data 421 may also contain references to the previous entry in the stream to assist with later traversal of the stream.

In the exemplary embodiments, because all memory changes are recorded after each snapshot, stream 510B can contain memory data for the same memory location updated after each snapshot was created. But during a rollback, the hypervisor only needs to load a particular memory location's data stored most recently after the desired snapshot. Subsequent entries for that memory location can become superfluous because they can be restored and then overwritten during rollback towards the desired snapshot. In some embodiments, snapshot 430 entries can be created at varied temporal periods. For example, in these embodiments, some snapshots may be taken every second while other snapshots are taken every 100 milliseconds. In these embodiments, each set of snapshots can reference the memory pages associated with the first changes to a specific memory location during that specific temporal period. Accordingly, in these embodiments, the less frequent snapshots can contain fewer memory data entries for the same location over the same amount of time as the more frequent snapshots. Using these separate temporal periods for snapshots, hypervisor 302 can create a hierarchy that allows traversing snapshots 430 and memory data 410 more efficiently. When rolling back the memory state in these embodiments, hypervisor 302 can use the less frequent snapshot references to traverse larger periods of time resulting in loading fewer memory data 410 entries and can then switch to the more frequent snapshots when nearing the desired snapshot. In these embodiments, the hybrid use of snapshot periods can balance the efficiency of the rollback operation with the usefulness of storing snapshots more frequently.

Figure 6:
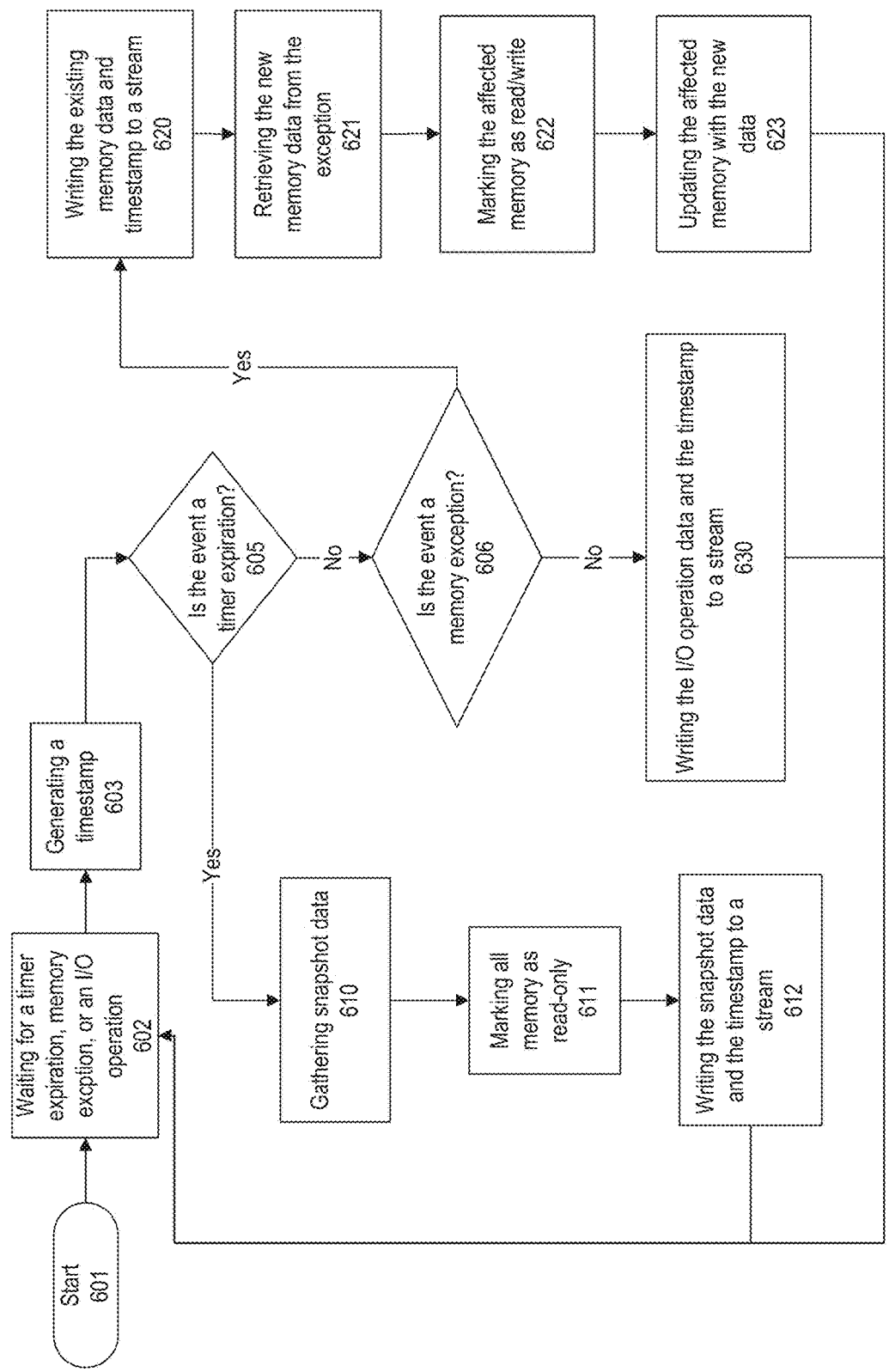
FIG. 6 is a flowchart of an exemplary method for generating stream content, consistent with embodiments of the present disclosure.

FIG. 6 is a flowchart of an exemplary method for generating stream content, consistent with embodiments of the present disclosure. It will be readily appreciated that the illustrated procedure can be altered to delete steps or further include additional steps. After initial step 601, a computing environment (e.g., hypervisor 302) can wait (step 602) for a timer expiration, a memory exception, or an I/O operation. After one of these occurs, the computing environment can generate (step 603) a timestamp (e.g., timestamp 505).

If the computing environment detects a timer expiration (step 605), the computing environment gathers (step 610) snapshot data. Snapshot data (e.g., snapshot data 430) can be any data necessary to allow the computing environment, processor, virtual processor, or other system component to execute the running process. For example, snapshot data can include all of the current register values, memory pointers, and/or reference counters. After gathering the snapshot data, the computing environment can mark (step 611) all memory as copy-on-write or read-only. Marking all memory as either copy-on-write or read-only will allow the computing environment to capture memory changes in other branches of the method. After marking all memory, the computing environment can write (612) the snapshot data and the generated timestamp to a stream (e.g., stream 400 and/or stream 510A). After writing the data to the stream, the computing environment can continue to wait (step 602) for additional events.

If, instead of a timer expiration, the computer environment detects (step 606) a memory exception (e.g., a read-only memory exception or a copy-on-write memory exception), the computing environment can write (step 620) the existing memory data and previously generated timestamp to a stream (e.g., stream 400 and/or stream 510B). After adding to the stream, the computing environment can retrieve (step 621) the new memory data from the exception. The computing environment can mark (step 622) the affected memory location as read/write and can update (step 623) the affected memory area with the memory value from the exception. This process allows the computing environment to capture all attempts to update memory, record those attempts, and ensure future attempts to update that memory area do not generate additional memory exceptions. After updating the affected memory area, the computing environment can continue waiting (step 602) for additional events.

In some embodiments, instead of marking all memory as read only (step 611) the computing environment can mark a subset of the memory as read only over the course of multiple snapshots. In these embodiments, the computing environment can choose a period of time over which all memory can be marked as read only. In these embodiments, during each snapshot within that time a non-overlapping subset of the memory can be marked as read-only such that after the time period is over, all memory locations can be marked as read-only at least one time during the time period. Accordingly, in these embodiments, the resources for processing the memory changes can be amortized over a group of snapshots instead of each snapshot.

If the computing environment detects neither a timer expiration (step 605) nor a memory exception (step 606), an I/O operation has occured. The computing environment can write (step 630) the I/O operation data and the previously generated timestamp to a stream (e.g., stream 400 and/or 510C). After recording the I/O event information, the computing environment can continue to wait (step 602) for additional event data.

The computing environment can follow this process until interrupted. Each event that is handled by the computing environment can add to the stream and can be used during a later rollback process. It is appreciated that each branch path in the method can write to the same stream or different streams depending on the embodiment. It is also appreciated that some of the steps performed in a different order will nevertheless lead to the same result.

FIG. 7 is a flowchart of an exemplary method for rollback of a computing environment, consistent with embodiments of the present disclosure. It will be readily appreciated that the illustrated procedure can be altered to delete steps or further include additional steps. After initial step 700, a computing environment (e.g., hypervisor 302), can acquire (step 710) one or more streams of data (e.g., stream 400 or streams 510A, 510B, and 510C). The streams, taken as a whole, can include snapshot data (e.g., snapshot data 430), memory data (e.g., memory pages 410), and I/O data (e.g., I/O data 420 and/or IRQ data 421). Additionally each entry in the stream or streams can include one or more snapshots. In some embodiments, the timestamp is the retired instruction count of the guest processor of a computing environment.

After the stream or streams are acquired, a desired snapshot is chosen (step 720). The choice of snapshot can be determined arbitrarily or systematically. In some embodiments, a user will choose the snapshot to use. In some embodiments, an algorithm can analyze the environment and choose a snapshot. For example, if a computing environment experiences a catastrophic error, the user or system might choose the most recent snapshot.

After choosing a snapshot, the computing environment can revert (step 730) the current memory state of the computing environment to the state that existed at the time of the snapshot. The system can gather all memory data in the stream having a timestamp after the desired snapshot and revert those areas of memory to the values stored in the stream. In some embodiments, the reversion can be accomplished by following backwards references in the stream between each memory page. After replacing the current memory values with those values updated following creation of the snapshot, the memory state can reflect the exact memory state at the time of the chosen snapshot.

After the memory state has been reverted, the computing environment can restart (740) the processor execution at the time of the snapshot. The computing environment can load the snapshot data from the stream and replace the values in the current processor state with the snapshot values. In some embodiments, the values replaced can be the values of all processor registers existing in the snapshot data. By loading the processor state stored in the snapshot, the computing environment can effectively put the processer in the exact state that existed at the time of the snapshot. Combined with the memory reversion, the processor can then start executing instructions. Because both the memory and processor state can be reverted, the processor can begin executing from the snapshot point in exactly the same manner as the processer originally executed from that same moment in time. In some embodiments, one of the processor registers will be the retired instruction counter for the guest operating system. This register, which measures the number of instructions that have been run by the guest operating system, can be stored in the snapshot. In these embodiments, when the snapshot is loaded from the stream, the value of the retired instruction count register is replaced by the value in the snapshot. In these embodiments, as the guest processor finishes executing instructions, this value is incremented in exactly the same manner as in the original execution of the running process.

As the processor executes instructions and interacts with memory, the computing environment can monitor the processor timestamp and execute (step 750) any I/O events recorded in the stream when the processor timestamp matches the timestamp recorded in the stream. When the processor timestamp value matches the timestamp of an I/O event in the stream, that I/O event is executed on the processor. The I/O event, typically the non-deterministic aspect of the execution pipeline, can be executed in a predictable and deterministic manner.

After all I/O data is executed, the computing environment can stop (step 760) execution. In some embodiments, if rerunning the execution of the process results in a system error, the process may exit before all entries in the stream are used. It is further appreciated that the method could be interrupted at any step by the user or some other event and restarted using a different snapshot and the same or different stream. Additionally, it is appreciated that the process may be fully repeated a plurality of times using different or the same streams and using the same or different snapshots.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A device for creating a rollback stream, the device comprising:
   a memory wherein one or more streams are stored in the memory, the one or more streams comprising data to allow for execution of a running process by a computing environment;
   one or more processors configured to:
      monitor the computing device for an occurrence of an event comprising one of a timer expiration, a memory exception or an input/output operation;
      responsive to detecting the occurrence of the event:
         gather snapshot data and generate a timestamp based on the event;
         marking at least a portion of the memory as one of copy-on-write, read-only or write based on which event is detected;
         and
         responsive to the event, write the snapshot data associated with the event and the timestamp to the one or more streams.

2. The device of claim 1, wherein the event is the timer expiration and wherein the snapshot data associated with the event comprises a state of at least one of the one or more processors.

3. The device of claim 2, wherein the one or more processors are configured to mark all the memory as one of copy-on-write or read-only responsive to the timer expiration.

4. The device of claim 1, wherein the event is the memory exception.

5. The device of claim 4, wherein, responsive to the memory exception, the one or more processors are further configured to mark at least a portion of memory as read-only.

6. The device of claim 4, wherein, responsive to the memory exception, the one or more processors being further configured to:
   mark at least the portion of memory as copy-on-write.

7. The device of claim 1, wherein the event is the input/output operation and the one or more processors being further configure to mark at least the portion of memory as write and write the I/O operation data and previously generated timestamp to the one or more streams.

8. The device of claim 1, wherein the timestamp is based on a processor register value.

9. The device of claim 1, wherein the timestamp is based on a processor retired instruction counter.

10. A method for the creation of a rollback stream, the method being performed by a computing device, the method comprising:
    storing one or more streams in memory for a computing device, the one or more streams comprising data to allow for execution of a running process by a computing environment;
    monitoring the computing device for an occurrence of an event comprising one of a timer expiration, a memory exception or an input/output operation;
    responsive to detecting the occurrence of the event:
       gather snapshot data and generate a timestamp based on the event;
       marking at least a portion of the memory as one of copy-on-write, read-only or write based on which event is detected; and
       responsive to the event, write the snapshot data associated with the event and the timestamp to the one or more streams.

11. The method of claim 10, wherein the event is the timer expiration and wherein the snapshot data associated with the event comprises a state of at least one of the one or more processors.

12. The method of claim 11, wherein all the memory is marked as one of copy-on-write or read-only responsive to the timer expiration.

13. The method of claim 11, wherein the timer expiration is the expiration of a plurality of timers operating at variable intervals.

14. The method of claim 10, wherein the event is the memory exception.

15. The method of claim 14, wherein responsive to the memory exception and marking at least a portion of memory as read-only.

16. The method of claim 14, wherein responsive to the memory exception marking at least the portion of memory as copy-on-write.

17. The method of claim 10, wherein the timestamp is based on a processor register value.

18. The method of claim 10, wherein the timestamp is based on a processor retired instruction counter.

19. A non-transitory computer readable storage medium storing instructions that are executable by one or more processors of a computing device to cause the device to perform a method for the creation of a rollback stream, the method comprising:
  storing one or more streams in memory for a computing device, the one or more comprising data to allow for execution of a running process by a computing environment
  monitoring the computing device for an occurrence of an event comprising one of a timer expiration, a memory exception or an input/output operation;
  responsive to detecting the occurrence of the event:
    gather snapshot data and generate a timestamp based on the event;
    marking at least a portion of the memory as one of copy-on-write, read-only or write based on which event is detected; and
  responsive to the event, write the snapshot data associated with the event and the timestamp to the one or more streams.

20. The non-transitory computer readable storage medium of claim 19, wherein the event is the timer expiration and wherein the snapshot data associated with the event comprises a state of at least one of the one or more processors.

21. The non-transitory computer readable storage medium of claim 20, wherein the timer expiration is an expiration of one of a plurality of timers operating at variable intervals.

22. The non-transitory computer readable storage medium of claim 20, wherein the expiration is an expiration of a plurality of timers operating at variable intervals.

23. The non-transitory computer readable storage medium of claim 19, wherein the event is the memory exception.

24. The non-transitory computer readable storage medium of claim 23, wherein responsive to the memory exception marking at least the portion of memory as read only.

25. The non-transitory computer readable storage medium of claim 23, wherein responsive to the memory exception marking at least the portion of memory as copy-on-write.

26. The non-transitory computer readable storage medium of claim 19, wherein the timestamp is based on a processor register value.

27. The non-transitory computer readable storage medium of claim 19, wherein the timestamp is based on a processor retired instruction counter.

* * * * *